United States Patent [19]

Zeewy

[11] Patent Number: 4,973,966
[45] Date of Patent: Nov. 27, 1990

[54] APPARATUS FOR DETERMINING THE SPEED OF MOTION OF SLOWLY MOVING OBJECTS

[76] Inventor: Abraham Zeewy, 2555 Channing Rd., University Heights, Ohio 44118

[21] Appl. No.: 198,403

[22] Filed: May 23, 1988

[51] Int. Cl.$^5$ .............................................. G01S 13/58
[52] U.S. Cl. ..................................... 342/61; 342/105; 342/124; 342/128
[58] Field of Search ............... 342/124, 128, 127, 135, 342/122, 61, 105, 109

[56] References Cited

U.S. PATENT DOCUMENTS

| | | | |
|---|---|---|---|
| 3,730,628 | 5/1973 | Wolcott et al. | 342/128 X |
| 3,761,946 | 9/1973 | Johannessen et al. | 342/105 X |
| 3,778,160 | 12/1973 | Wolcott | 342/127 X |
| 4,019,562 | 4/1977 | Shiraiwa et al. | 342/61 X |
| 4,044,353 | 8/1977 | Levy | 342/124 |
| 4,107,684 | 8/1978 | Watson, Jr. | 342/128 X |
| 4,146,890 | 3/1979 | Klensch | 342/105 |
| 4,186,397 | 1/1980 | Sternberger et al. | 342/128 X |
| 4,238,795 | 12/1980 | Schiek et al. | 342/128 X |
| 4,254,482 | 3/1981 | Newman | 342/124 |
| 4,642,777 | 2/1987 | Schwanke | 342/124 X |
| 4,860,014 | 8/1989 | Shores et al. | 342/105 |

OTHER PUBLICATIONS

Article Entitled - "Varactor Tuned Gunnplexer TM Transceiver 'Front End' for Amateur Applications", M/A COM Semiconductor Products, Inc., Bulletin No. 7624G, Apr., 1985.

Primary Examiner—Gilberto Barron, Jr.
Attorney, Agent, or Firm—D. Peter Hochberg; Mark Kusner; Louis J. Weisz

[57] ABSTRACT

A Gunn microwave transmitter/receiver is coupled to an antenna to transmit microwave signals perpendicularly to a surface of a motionless or a slow moving object and to receive waves reflected from the object. The frequency of the oscillator of the Gunn transmitter is controlled by the output of a sawtooth wave generator. Accordingly, the output of the transmitter is cyclically and linearly varied from a first transmitted frequency to a second transmitted frequency. An accurate timer cyclically resets the both the sawtooth generator and digital processing circuitry.

The wave reflected from the object and the signal transmitted at the time of arrival of the reflected wave are processed to detect the difference between the reflected wave and the transmitted wave, or the first negative to positive zero crossing that occurs after reset. This event initiates a time window which is terminated at the end of the cycle in which the relationship is detected. During the time window, output signals from a relatively high frequency pulse source are accumulated in a counter and subsequently stored in the memory of a processor. Motion of the subject object in defined units e.g., inches is directly related to the difference in counts accumulated in the counter in successive cycles and speed is determined by relating the measured change to the time over which the change occurred. The distance to the motionless object is calculated from the frequency difference between the reflected and the transmitted waves, and/or from the phase relationship between these two signals.

10 Claims, 2 Drawing Sheets

APPARATUS FOR DETERMINING THE SPEED OF MOTION OF SLOWLY MOVING OBJECTS

TECHNICAL FIELD

This invention relates to microwave and digital circuits for remote measurement of to the speed of relatively slow moving object.

BACKGROUND OF THE INVENTION

A variety of apparatus and methods e.g, Doppler radar sets, are known for the accurate measurement of the speed of motion of relatively fast moving objects. However, the measurement of slowly moving objects e.g., objects moving at a speed of a few inches per minute or being motionless, is a far more difficult problem. In the case of slow moving objects the Doppler frequency shift is very small; therefore, it is difficult to accurately determine absolute speed of an object and changes in speed of an object.

Measurement of the rate of rise of molten metal in bottom filled molds is an example of an environment in which the object moves slowly. Experience shows that accurate control of the rate of rise of the molten metal in th mold produces improved product. U.S. Pat. Nos. 4,019,562 and 4,642,777 are examples of prior art arrangements which utilize Doppler shifts to measure the rate of rise of molten metals. Bulletin No. 7642G, entitled Varactor Tuned Gunnplexer Transceiver "Front End", which is dated Apr. 1985 and issued by M/A COM Semiconductor Products Inc. describes commercially available Gunn oscillator transmitter/receivers and applications of those transceivers. A further undated publication of Microwave Associates entitled "Microwave Components for Motion Detection" describes further applications of such transceivers.

DISCLOSURE OF THE INVENTION

In accordance with the present invention, a microwave transmitter/receiver is arranged to generate an output signal, which is cyclically and linearly varied from a first frequency to a second frequency, is transmitted perpendicularly to a face of a moving or motionless object; and the wave reflected from the object and the signal transmitted at the time of arrival of the reflected wave are processed to detect a readily discernable significant relationship between the waves. For slow speed measurement, a time window is initiated at the beginning of each cycle and terminated at the end of the cycle in which the relationship is detected. During the time window, output signals from a relatively high frequency pulse source are accumulated in a counter and subsequently stored in the memory of a processor. Motion of the subject object, in defined units e.g., inches, is directly related to the difference in counts accumulated in the counter in successive cycles and speed is determined by relating the measured change to the time over which the changes in counts occurred.

THE DRAWING

FIG. 1 is a schematic block diagram of a motion detector in accordance with the present invention; and FIG. 2 is a representation of signals which occur in the operation of the detector of FIG. 1.

DETAILED DESCRIPTION

Figure 1:
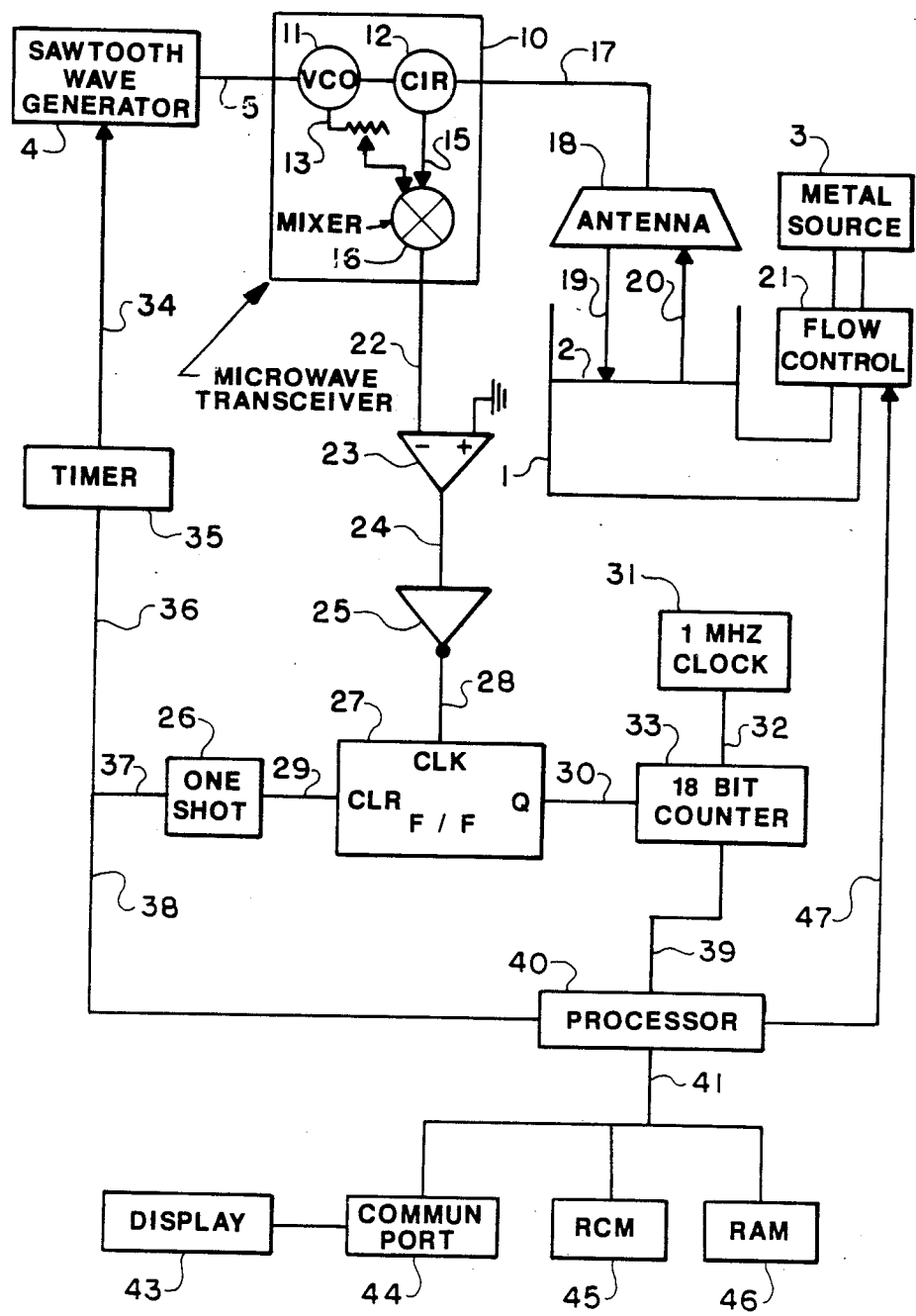

A schematic block diagram of an illustrative embodiment of applicant's invention is shown in FIG. 1. The microwave transceiver 10 of FIG. 1, comprises a Gunn oscillator 11 which directly converts DC signals to RF energy, circulator 12 couples output signals of the oscillator 11 to the antenna 18, and couples reflected signals received by the antenna 18 to the miser 16 via the path labeled 15. The coupler 13 serves to couple a small amount of energy from the oscillator 11 to the mixer 16.

The mixer 16 generates the products of modulation of the reflected wave on conductor 15 and the locally generated wave from coupler 13. In accordance with this invention, the mixer output signal of interest is the local oscillator wave minus the reflected wave. Because of the linear modulation of the oscillator, the product of interest is always a substantial non-zero value independently of motion. The Doppler shift which is the result of motion of the monitored object is small and can be ignored int he operation of the present invention. For example, with the parameters of operation described later herein, the mixer output product of interest to this invention is approximately 60 cycles for a target which is five feet from the antenna, and approximately 120 cycles for a target which is ten feet from the antenna.

For fixed frequency operation of the oscillator 11, a fixed bias voltage e.g., 1 volt DC is applied over conductor 5 to the oscillator 11.

Figure 2:
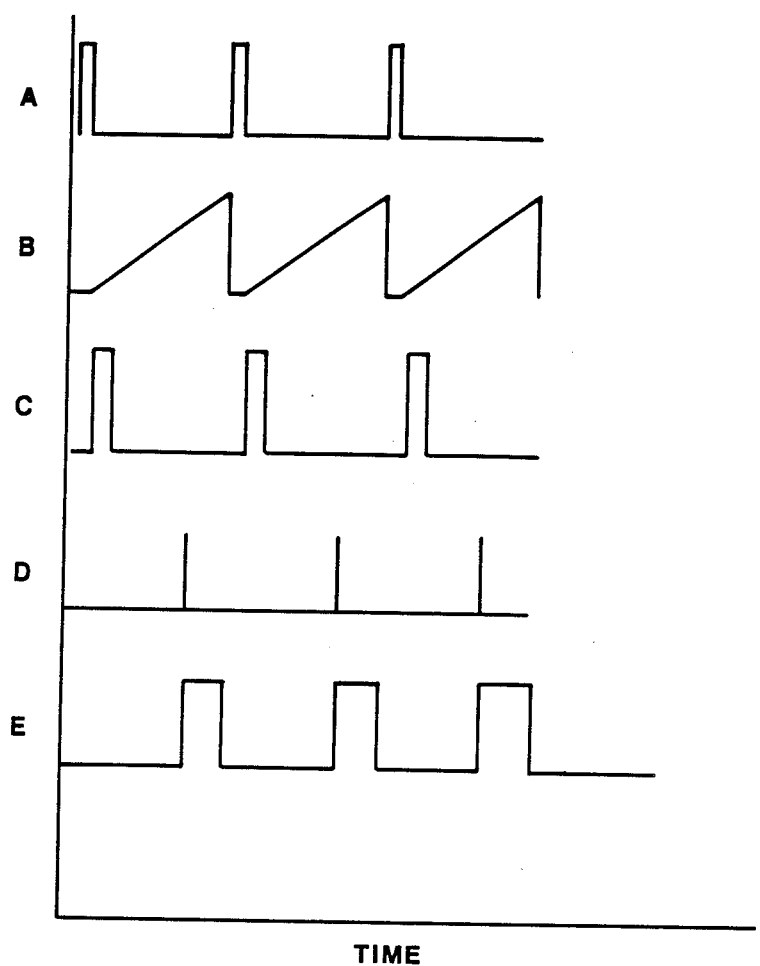

In accordance with applicant's invention, sawtooth wave generator 4 generates linearly rising output signals on conductor 5 which linearly and cynically modulate the output frequency of the oscillator 11. A sawtooth wave is illustrated in FIG. 2, line B of the drawing. The wave shapes of FIG. 2 are intended to show sequential relationships of the various waves and are not intended to illustrate absolute scale of amplitude or of duration with respect to time. Under the influence of the sawtooth wave on conductor 5, the microwave transceiver 10 generates microwave signals which vary in frequency in accordance with the sawtooth wave. For purposes of illustration only, the sawtooth wave varies from 1 volt to 20 volts and the output of the oscillator 11 is from 10.250 ghz when the sawtooth is at 1 volt to 10.310 ghz when the sawtooth reaches 20 volts. Timing of the sawtooth wave generator 4 is defined by output signals of the timer 35 on conductor 34. The timer 35 is an accurate timer which generates output signals of 2 to 3 microseconds duration once every 10.5 milliseconds. Output signals of the timer 35, as they occur on conductors 34 and 36, are illustrated in line A of FIG. 2. As previously indicated herein, the width of the wave shape A of FIG. 2 is not drawn the same scale as the width of the wave B of FIG. 2. The sawtooth wave generator 4 is cyclically reset by timer output signals on conductor 34. Immediately after termination of the output signal on conductor 34, a constant current source in the sawtooth wave generator 4 begins to charge a capacitor to generate the desired sawtooth output signals.

Timer output signal on conductors 36 and 38 provide a non-maskable interrupt to the processor 40. That interrupt signal indicates to the processor the beginning of a new data collection period of time and provides a time base for processor calculations.

Time output signals on conductors 36 and 37 drive a one shot circuit 28 which in turn generates one-half millisecond clear signals on conductor 29 for resetting the flip-flop 27 (see line C of FIG. 2). The output signal at terminal Q of flip-flop 27 provides a counter enable signal on conductor 30. When the signal on conductor 30 is high, the 16 bit counter 33 is enabled to receive clock pulses from the clock source 31 over conductor 32. The clock source 31 generates pulses at a 1 megahertz rate. The counter 33 accumulates clock pulses during the time that the conductor 30 is high. The flip-flop 27 is set to the "1" state by a positive signal on conductor 26 which is connected to the CLK terminal of the flip -flop 27; and the flip-flop 27 is reset to the "0" state by a positive signal on conductor 29 which is connected to the CLR terminal of the flip -flop 27. A positive signal on conductor 26 identifies the detection of a significant phase relationship between the microwave signal reflected from the target and the microwave signal generated by the oscillator 11 at the time the reflected signal is received; and a high signal on conductor 29 signifies the beginning of a new time period of the timer 35.

The significant phase relationship between the reflected wave and the locally generated wave, which is of interest to this invention, is the occurrence of a negative to positive zero crossing at the output of the mixer 16. The operational amplifier 23 is connected as a high gain comparator and a positive going signal on conductor 22 after a zero crossing generates a negative going signal on conductor 24. The invertor 25 in turn generates a corresponding positive going signal on conductor 26 to set the flip-flop 27 to the "1" state. The signals on conductor 26 are illustrated in line D of FIG. 2; and the output signals from the Q terminal of flip-flop 27 are illustrated in line E of FIG. 2. The periods of the square waves illustrated in line E of FIG. 2 constitute the "time windows" in which the 16 bit counter 33 accumulates clock pulses from the clock source 31.

In the illustrative embodiment of FIG. 1, microwave signals from the transceiver 10 are transmitted to the antenna via wave guide 17 and the antenna 18 in turn transmits the microwave energy toward the moving surface 2 and receives waves reflected from that surface. The transmitted waves are shown as line 19 in FIG. 1 and the reflected waves are shown as line 20.

In each succeeding time cycle defined by output signals of the timer 35, the processor 40 reads the contents of counter 33 via the multiconductor bus 39 and stores data obtained from the counter in RAM 46 for subsequent processing. Immediately after reading the content of counter 33, the processor, via the bus 39, resets counter 33 to a count of zero to prepare the counter for accumulation of the clock pulses during the next time window.

The individual counts obtained from the counter 33 provide no information about either the distance between the antenna and the target or about the speed of the target. The information of interest to the present invention, is the change in counts accumulated in the counter 33 in successive time cycles.

At the beginning of a pour, the detecting arrangement of FIG. 1 must be calibrated. This is preferably accomplished by an appropriate program stored in ROM 45 and controlled by processor 40. Calibration occurs over many cycles of the timer 35. As the surface 2 of the metal in the mold 1 rises, the times of occurrence of the zero crossings of interest will change with respect to the end of a time cycle and the counts in the counter 33 will change from cycle to cycle. The calibration is accomplished by finding the maximum count accumulated in the counter 33 in any given time cycle and the minimum count which occurs in the counter 33 in a time cycle. The difference between the maximum and minimum counts defines the number of counts which represent a distance equal to the wavelength of the transmitted wave. This calibration information is subsequently used in the calculation of distance moved by the target and the speed of that movement.

In a typical application in which the rise of molten metal is monitored, a rate of rise of 6 inches per minute is typical. In the illustrative embodiment described above-herein, a microwave frequency of 10.250 ghz represents a wavelength of approximately 1.15 inches. Accordingly, motion of 6 inches, equates to slightly more than 5 wavelengths at the transmitted microwave frequency. The timer 35 defines time cycles of 10.5 milliseconds per cycle; therefore, in 1 minute approximately 95 equal time cycles occur in which 95 measurements are performed.

At microwave frequencies, the effects of the flux at the surface of the molten metal 2 on the waves remain constant over many measurement periods; however, stray reflections of the transmitted microwaves cause or may cause random or periodic noise in the received wave. Accordingly, the processor 40 performs a smoothing function to the calculations by averaging the motion over a substantial period of time, e.g., 20 seconds. The calculations of the processor 40 in conjunction with established target values for rate of rise of the molten metal are employed to generate control signals for the flow control 21 over cable 47 and to provide display signals which are transmitted to the display 43 over the bus 41 and the communication port 44.

The periods of time set forth in the illustrative example of FIGS. 1 and 2 as described above herein, are representative of satisfactory parameters of operation; however, substantial changes may be made in these parameters without departing from the spirit and scope of the invention. Similarly the frequency of the transmitted microwave signal and the amount of modulation of that signal are representative of acceptable operating conditions.

The invention has been described with particular attention to its preferred embodiment and for a typical slow speed application; however, it should be understood that variations and modifications within the spirit and scope of the invention may occur to those skilled in the art to which the invention pertains.

What is claimed is:

1. Apparatus for determining the speed of motion of a slow moving object, said apparatus comprising:
    means for generating microwave signals;
    timer means for defining successive periods of time;
    means for controlling said generating means for continuously changing the frequency of said microwave signal from a first frequency to a second frequency during each of said successive periods of time;
    combining means coupled to said generating means for transmitting said microwave signals towards a face of a subject object and for receiving microwave signals reflected from said object;
    mixing means coupled to said combining means and to said generating means for generating output signals having a zero crossing which are the differences between said reflected signals and said generated signals;
    detecting means responsive to output signals of said mixing means and said timer means for detecting the first occurrence of a zero crossing in said output signals after the beginnings of said periods of time and for generating corresponding counter enable signals;

a source of clock pulses;

counter means comprising an input coupled to said clock pulse source and responsive to said counter enable signals for counting the number of clock pulses occurring when said counter is enabled; and processor means responsive to said timer signals and to data read from said counter for calculating the motion and speed of said subject object.

2. Apparatus in accordance with claim 1 wherein:
said generating means comprises a voltage controlled Gunn oscillator comprising a control input terminal; and an output terminal and
said means for controlling said generating means comprises a sawtooth wave generator and means for coupling output signals of said sawtooth generator to said control terminal.

3. Apparatus in accordance with claim 1 further comprising:
means controlled by said processor means for displaying the calculated values of motion and speed.

4. Apparatus in accordance with claim 1 wherein:
said processor means further comprises:
means for storing target values of motion of said object and means for controlling the speed of motion of said object.

5. Apparatus in accordance with claim 1 wherein:
said processor means further comprises:
means for storing the number of pulses accumulated in said counter means in each of said time periods; and
wherein said processor means calculates motion and speed of motion as a function of the differences in counts accumulated in said counter in successive periods of time.

6. Apparatus in accordance with claim 5 wherein:
said processor means comprises means for averaging the calculated values over a plurality of said equal periods of time.

7. Apparatus in accordance with claim 1 wherein:
said processor means in a program controlled processor.

8. Apparatus in accordance with claim 1 wherein:
said processor means further comprises means for calibrating said apparatus.

9. Apparatus in accordance with claim 1 wherein:
the successive periods of time defined by said timer means are of equal duration.

10. Apparatus in accordance with claim 1 wherein:
said controlling means linearly changes the frequency of said microwave signal from the first frequency to the second frequency during each of said successive periods of time.

* * * * *